(12) United States Patent
Lovegrove et al.

(10) Patent No.: US 9,057,536 B2
(45) Date of Patent: Jun. 16, 2015

(54) SOLAR THERMAL COLLECTORS

(75) Inventors: Keith Malcolm Lovegrove, Fisher (AU); Joseph Sydney Coventry, Watson (AU); Robert Brunswick, Wamboin (AU); Gregory John Burgess, Kaleen (AU); Wie Shuen Joe, Kaleen (AU); Jessica Neeta Preston, Griffith (AU); John Downing Pye, O'Connor (AU)

(73) Assignee: Sunrise CSP Pty Limited (AU)

( * ) Notice: Subject to any disclaimer, the term of this patent is extended or adjusted under 35 U.S.C. 154(b) by 724 days.

(21) Appl. No.: 12/996,394

(22) PCT Filed: Jun. 9, 2009

(86) PCT No.: PCT/AU2009/000725
§ 371 (c)(1),
(2), (4) Date: Jun. 21, 2011

(87) PCT Pub. No.: WO2009/146511
PCT Pub. Date: Dec. 10, 2009

(65) Prior Publication Data
US 2011/0242689 A1     Oct. 6, 2011

(30) Foreign Application Priority Data

Jun. 6, 2008 (AU) ................................ 2008902867

(51) Int. Cl.
*F24J 2/12* (2006.01)
*F24J 2/52* (2006.01)
*F24J 2/54* (2006.01)

(52) U.S. Cl.
CPC .. *F24J 2/12* (2013.01); *Y02E 10/42* (2013.01); *F24J 2/5203* (2013.01); *F24J 2/54* (2013.01); *Y02E 10/47* (2013.01)

(58) Field of Classification Search
CPC ........ G02B 7/00; G02B 17/00; G02B 17/002; G02B 17/004; G02B 17/006; G02B 19/00; G02B 19/0004; G02B 19/0023; G02B 19/0033; G02B 19/0038; G02B 19/0042; G02B 19/009; G02B 19/0095; F24J 2/12; F24J 2/5203; F24J 2/54; Y02E 10/42; Y02E 10/47
USPC .......................... 126/684–497; 136/244, 246; 359/850–853, 855–858
See application file for complete search history.

(56) References Cited

U.S. PATENT DOCUMENTS

| | | |
|---|---|---|
| 811,274 A | 1/1906 | Carter |
| 2,985,881 A | 5/1961 | Holland |

(Continued)

FOREIGN PATENT DOCUMENTS

| | | |
|---|---|---|
| AU | 2001278672 | 2/2002 |
| CA | 1205556 | 6/1986 |

(Continued)

*Primary Examiner* — Stephone B Allen
*Assistant Examiner* — Kimberly N Kakalec
(74) *Attorney, Agent, or Firm* — Galbreath Law Offices, P.C.; John A. Galbreath

(57) ABSTRACT

A dish structure (10) has a virtual front surface, the front surface having a periphery, and a plurality of spaced apart non overlapping elongate front beams (16), each of which extends between two points on the periphery. Each front beam (16) has at least one mounting area (20) for receiving a reflective panel (150), the at least one mounting area (20) conforming substantially to the virtual front surface in the longitudinal direction of the front beam (16).

21 Claims, 15 Drawing Sheets

(56) References Cited

U.S. PATENT DOCUMENTS

| | | | |
|---|---|---|---|
| 3,713,727 A | | 1/1973 | Markosian |
| 3,762,207 A | | 10/1973 | Weiser |
| 4,247,218 A | | 1/1981 | Jeannin |
| 4,295,709 A | * | 10/1981 | Wood .......................... 359/853 |
| 4,395,581 A | | 7/1983 | Girard |
| 4,457,297 A | | 7/1984 | Sobczak et al. |
| 4,558,551 A | | 12/1985 | Sevelinge |
| 4,566,432 A | * | 1/1986 | Sobczak et al. ............. 126/606 |
| 4,583,520 A | | 4/1986 | Dietrich |
| 4,602,853 A | * | 7/1986 | Barr ........................... 359/852 |
| 4,656,996 A | | 4/1987 | Aharon |
| 4,731,144 A | | 3/1988 | Kommineni |
| 4,845,510 A | | 7/1989 | Chang |
| 4,845,511 A | | 7/1989 | Grayson |
| 4,912,903 A | | 4/1990 | Mogami |
| 5,224,320 A | | 7/1993 | Mai |
| 5,680,145 A | | 10/1997 | Thomson |
| 6,278,416 B1 | | 8/2001 | Harless |
| 6,485,152 B2 | | 11/2002 | Wood |
| 2001/0036024 A1 | | 11/2001 | Wood |
| 2004/0027309 A1 | | 2/2004 | Swarup |
| 2004/0216734 A1 | * | 11/2004 | Lawheed ...................... 126/573 |
| 2009/0101208 A1 | | 4/2009 | Vandal |

FOREIGN PATENT DOCUMENTS

| | | |
|---|---|---|
| GB | 1599527 | 10/1981 |
| JP | 61157004 | 7/1986 |
| SU | 992681 | 1/1983 |
| SU | 1252844 | 8/1986 |
| WO | WO 94/11918 | 5/1994 |
| WO | WO 96/02797 | 2/1996 |
| WO | WO 2004/013547 | 2/2004 |
| WO | WO2008/126117 | 10/2008 |
| WO | WO2009/015424 | 2/2009 |

\* cited by examiner

SOLAR THERMAL COLLECTORS

FIELD OF INVENTION

This invention relates to dish like structures and more particularly to dish like structures for parabolic mirror type solar thermal collectors. However, the invention is not limited to parabolic mirror type solar thermal collectors.

BACKGROUND

Sunlight is a source of "renewable" energy that may be captured for human use using various techniques. One method of concentration is to use a number of large parabolic dishes, each of which that supports a mirrored surface that concentrates the light onto its own heat collector fixed relative to the mirrored surface. Each dish is manipulated so that the sunlight stays focused on the collection point as the Earth moves during the day.

Each dish usually has a radius in the order of 10 to 30 meters. The mirrored surface needs to follow a desired parabolic surfaces to a relatively high degree of accuracy so that the focal area is relatively small and the efficiency high.

Prior art techniques of forming the structure of the dish have been to use space frames having nodes with individual struts running between the nodes. The individual node connections and the struts are manufactured to a high dimensional accuracy so that when assembled the resulting dish structure has a high degree of dimensional accuracy.

The problem with prior art space frame designs is that the individual components are relatively expensive to manufacture and so the cost of a dish is, generally, high. This may be acceptable for a one off design, such as a prototype or a radio telescope dish, but the cost is too high for use in a solar thermal power plant that may require hundreds or thousands of individual collector dishes. A further problem is that mirrors cannot easily be mounted directly to the space frame and must be mounted via their own individual support structure. This increases the mass and cost of the overall structure.

SUMMARY OF THE INVENTION

In an attempt to overcome at least one of the disadvantages of conventional space frame designs the invention in one broad form provides a dish structure having:
  a virtual front surface, the front surface having a periphery, and
  a plurality of spaced apart non overlapping elongate front beams, each of which extends between two points on the periphery,
  each front beam having at least one mounting area for receiving a reflective panel, the at least one mounting area conforming substantially to the virtual front surface in the longitudinal direction of the front beam.

Each front beam may have a face and said at least one mounting area may be part of, flush with, protrude from or be recessed relative to the face.

The at least one mounting area of each front beam may comprise a single mounting area. Each front beam may have a face conforming substantially to the virtual front surface in the longitudinal direction of the front beam. In a preferred form the face is a front face of each beam.

The dish may include a plurality of sheet like reflective panels mounted on said at least one mounting area of the front beams, the panels having a rear surface, that area of rear surface overlaying a mounting area conforming substantially to the curvature of the respective mounting area in the longitudinal direction of the front beam.

When each panel is mounted to at least one mounting area, the panels preferably each have a surface that reflects electromagnetic radiation that, when mounted on the front beams, substantially comprises part of a second virtual surface. The second virtual surface is preferably a paraboloid of revolution. Each panel may be bonded to the front surface of the front beams.

Each panel may have a pair of spaced apart, non intersecting side edges with each side edge extending along a front beam. Preferably, substantially all of each side edge is bonded to the front surface of the front beams.

The front beams may be curved in one or more directions. Thus, when viewed perpendicular to the front face, the face may be straight or curved. The front face of each beam may be curved transversely across its width but in preferred forms is flat across its width.

The front beams are preferably curved and spaced apart to conform to a virtual front surface that is substantially a paraboloid of revolution, a surface that is commonly referred to as being a parabolic surface.

The dish may also include a series of spaced apart non overlapping elongate rear beams, each of which extends transversely across and is attached to the rear of at least two front beams.

For clarity where a rear beam overlaps a front beam shall be referred to as a node.

Preferably each rear beam extends between two points on or adjacent the periphery.

The rear beams preferably cross each front beam at substantially 90 degrees to the respective front beam at each node and at that point preferably substantially in a plane parallel to the plane tangent to the paraboloid. It will be appreciated that due to the depth of the front beams the ream beams cannot actually be tangent to the virtual surface. However, considering the dish will be approximately 10 meters in diameter and the front beams are in the order of 10 cm deep, the rear beams are effectively in the plane tangent to the paraboloid.

The front and rear beams are each preferably a continuous and unitary item but may be constructed of two or more shorter sections joined end on end.

The front and rear beams are preferably a U shaped profile having a base and two side walls. The base of each front beam defines its front face. The front and rear beams are preferably formed of continuous rolled steel strip.

The front and rear beams preferably have flanges extending transversely from the free end of each side wall. Preferably the rear beams extend across the front beams with the flanges of the front and rear beams in contact at the nodes.

The front and rear beams may be attached to each other at the nodes by various methods, including welding, rivets, bolts and nuts, glues and adhesives.

The dish may also include a rear structure that is, preferably, connected to the rear beams. The rear structure preferably includes a plurality of pyramid like structures. Each pyramid includes at least three, preferably four, struts joined at an apex, with each strut extending to the rear beams. Preferably the struts extend to nodes but may extend to locations between the nodes.

In the preferred embodiment struts do not extend to every node but only to every third rear beam, with two rear beams between. In the preferred embodiment, for those nodes to which one or more struts extend, a saddle with studs is placed over the rear beam with the studs passing through aligned apertures in the overlapping portions of the front and rear beams. The studs are preferably threaded and nuts are secured thereto to firmly clamp the components together.

For those nodes that do not have a strut attached, a saddle is preferably not used and the front and rear beams are preferably secured together using rivets. Preferably these are self piercing rivets. Other means of securing the beams together at these nodes may be used.

The struts may be connected directly to the rear beams or, where joining components, such as saddles, are used, to these joining components.

Where each pyramid has four struts, preferably the struts extend at 90 degrees to each other from the apex. Pyramids at the periphery of the dish may only need three struts. These are effectively a four strut pyramid with one strut missing, with the three struts arranged at 90 degrees to each other.

The struts are preferably formed of hollow tubing, preferably round section tubing. Non-circular sections may be used. More preferably the end portions of the struts are flattened at one or both ends.

The apexes of all the pyramids preferably lie on a virtual spherical surface.

Chord members preferably extend between the apexes of the pyramids. Where the apexes of the pyramids lie on a virtual spherical surface the chord members all extend at generally the same angle to the tangent to the sphere. In the preferred embodiment the pyramids (expect those adjacent the periphery) each have four chord members that extend to four separate pyramids.

The invention also provides a method of constructing a dish structure having a virtual front surface, the virtual front surface having a periphery, and a plurality of spaced apart non overlapping elongate front beams, wherein each beam has at least one mounting area for receiving a reflective panel, the at least one mounting area conforming substantially to the virtual front surface in the longitudinal direction of the front beam, the method including:
  providing a jig with a plurality of support points at known locations corresponding to locations on the surface;
  providing a plurality of elongate front beams, each beam having at least one mounting area;
  placing each of the beams on at least two support points in a spaced apart, non overlapping arrangement with at least said at least one mounting area resting on at least two support points;
  ensuring that each mounting area contacts all support points that it extends over to place the front beams in a predetermined spatial relationship, and
  securing support members to the front beams to form the dish structure and to maintain the front beams in the predetermined spatial relationship.

The invention also provides a method of constructing a dish structure having a plurality of spaced apart non overlapping elongate front beams, each of which has at least one mounting area for receiving a reflective panel, the at least one mounting area conforming substantially to a virtual front surface of non constant radius of curvature, the method including:
  forming, creating or modifying each front beam so said at least part of the front has a curvature along its length;
  providing a jig with a plurality of support points at known locations corresponding to locations on the virtual surface;
  placing each of the front beams on at least two support points in a spaced apart, non overlapping arrangement with at least the at least one mounting area resting on at least two support points, and
  ensuring that each mounting area contacts all support points that it extends over to place the front beams in a predetermined spatial relationship.

In another broad form the invention provides a curved reflector of electromagnetic radiation, the reflector including:
  a frame having a plurality of front beams each having at least one curved mounting area;
  a plurality of curved mirror panels,
  wherein the mirror panels are mounted directly to said at least one mounting areas of the front beams.

The mirror panels are preferably load bearing and are mounted so as to provide a structural contribution to the reflector.

In another broad form the invention provides a dish structure having a plurality of spaced apart non overlapping elongate front beams, each of which has at least one mounting area for receiving a reflective panel, the at least one mounting area conforming substantially to a virtual front surface, said plurality of front beams attached to support members, wherein the support members include a plurality of pyramids, wherein each pyramid has at least three struts that extend from the apex at 90 degrees to at least one adjacent strut.

Most pyramids may include four struts that extend from an apex at 90 degrees to each other.

In another broad form the invention provides a dish structure having a plurality of spaced apart non overlapping elongate front beams, each of which has at least one mounting area for receiving a reflective panel, the at least one mounting area conforming substantially to a virtual front surface, wherein the support members include a plurality of pyramids, each pyramid including struts that extend from an apex, the apexes of the pyramids being located on a virtual spherical surface.

The apexes of the pyramids are preferably joined or connected to each other by members that extend from one apex to an apex.

In another broad form the invention provides a dish structure having a plurality of spaced apart non overlapping elongate front beams, each of which has at least one mounting area for receiving a reflective panel, the at least one mounting area conforming substantially to a virtual front surface, said plurality of front beams attached to support members, wherein the support members include a plurality of rear beams that extend at substantially 90 degrees across the front beams.

Unless the context clearly requires otherwise, throughout the description and any claims the words 'comprise', 'comprising', and the like are to be construed in an inclusive sense as opposed to an exclusive or exhaustive sense; that is to say, in the sense of "including, but not limited to".

BRIEF DESCRIPTION OF THE DRAWINGS

FIG. 19b is an end view of the front beam of FIG. 19a.

DETAILED DESCRIPTION OF PREFERRED AND OTHER EMBODIMENTS

Figure 17:
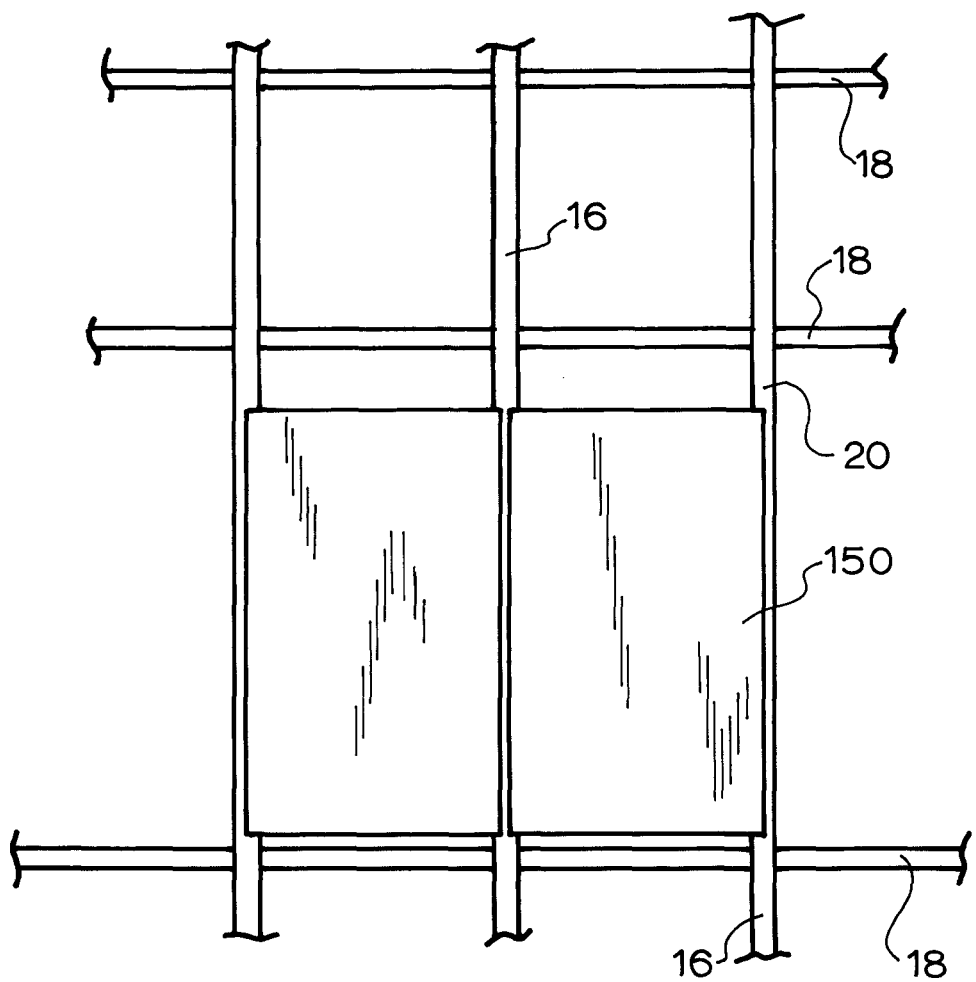
FIG. 17 is a plan view from the front showing the mounting arrangement of mirrors on the front structure of the dish.
Figure 18:
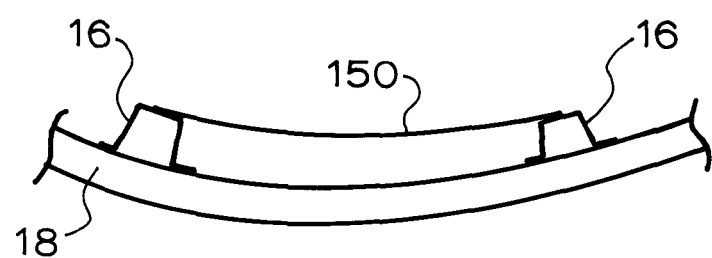
FIG. 18 is a cross sectional view showing the mounting arrangement of mirrors on the front structure of the dish.

Referring to FIGS. 1 to 15 there is shown the structure of a parabolic dish 10, for use with mirrors, according to an embodiment of the invention and a jig for its construction. For clarity the mirrors are not shown in these drawings but are shown in FIGS. 17 and 18.

The dish structure may be divided into a front structure 12 and a rear structure 14.

The front structure 12 is formed of a series of elongate front beams 16 that are arranged side by side and spaced apart. A series of elongate rear beams 18 extend generally transversely across the rear of the front beams 16 and are also spaced apart and arranged side by side. In this embodiment the front face 20 of each beam provides a single mounting area upon which mirrors may be mounted.

The front beams 16 are curved so the mounting area or areas of each front beam 16 follows a virtual curved surface along its length. In this case the front surface 20 follows the virtual curved surface along its length. The front beams 16 are positioned sideways to each other so that as a group the front surfaces 20 (ignoring the width of the front beams) follow a parabolic virtual surface (a paraboloid of revolution). Whilst the front and rear beams 16, 18 may appear in the drawings to be curved in a single plane, each beam may be curved about two or more points or a point offset to the side and/or front of the beam. Thus adjacent beams are not necessarily straight and/or parallel to each other and, unless they are straight when viewed from perpendicular to the front face, are not parabolic. This is not to exclude the use of front beams that are parabolic but the use of non parabolic front beams has significant advantages.

The area where each rear beam 18 crosses a front beam 16 may be considered to be a node. Each front beam 16 extends across multiple nodes and preferably a single continuous front beam 16 extends from one side of the dish across multiple nodes to the other side. The rear beams 18 extend across multiple nodes and preferably a single continuous rear beam extends from one side of the dish across multiple nodes to the other side.

Each front and rear beam 16, 18 is preferably a continuous unitary beam and is not fabricated from a series of separate components joined end on end. However, the use of beams fabricated from multiple components joined end on end is within the scope of the invention.

The front and rear beams 16, 18 preferably cross each other at 90 degrees at each node 22 and in plan view the front and rear beams 18 are not straight or parallel but are curved.

Figure 1:
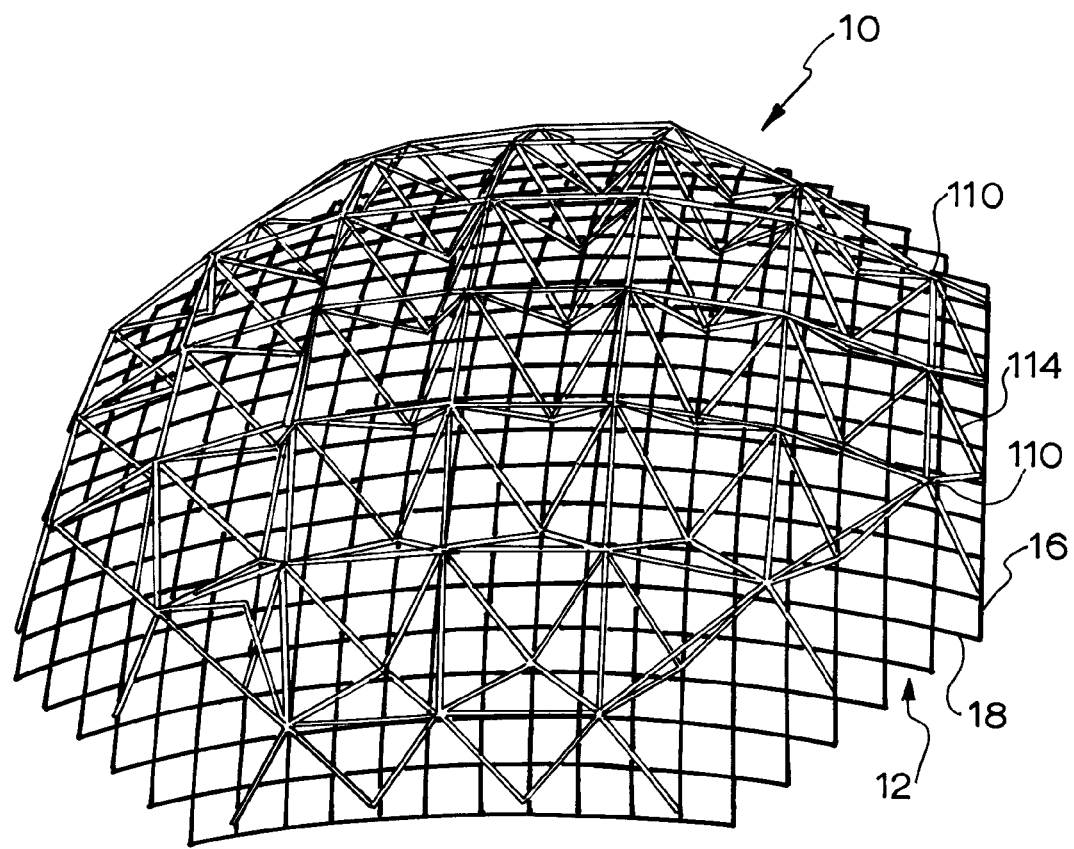
FIG. 1 is a perspective view from the rear of a dish structure according to an embodiment of the invention.
Figure 2:
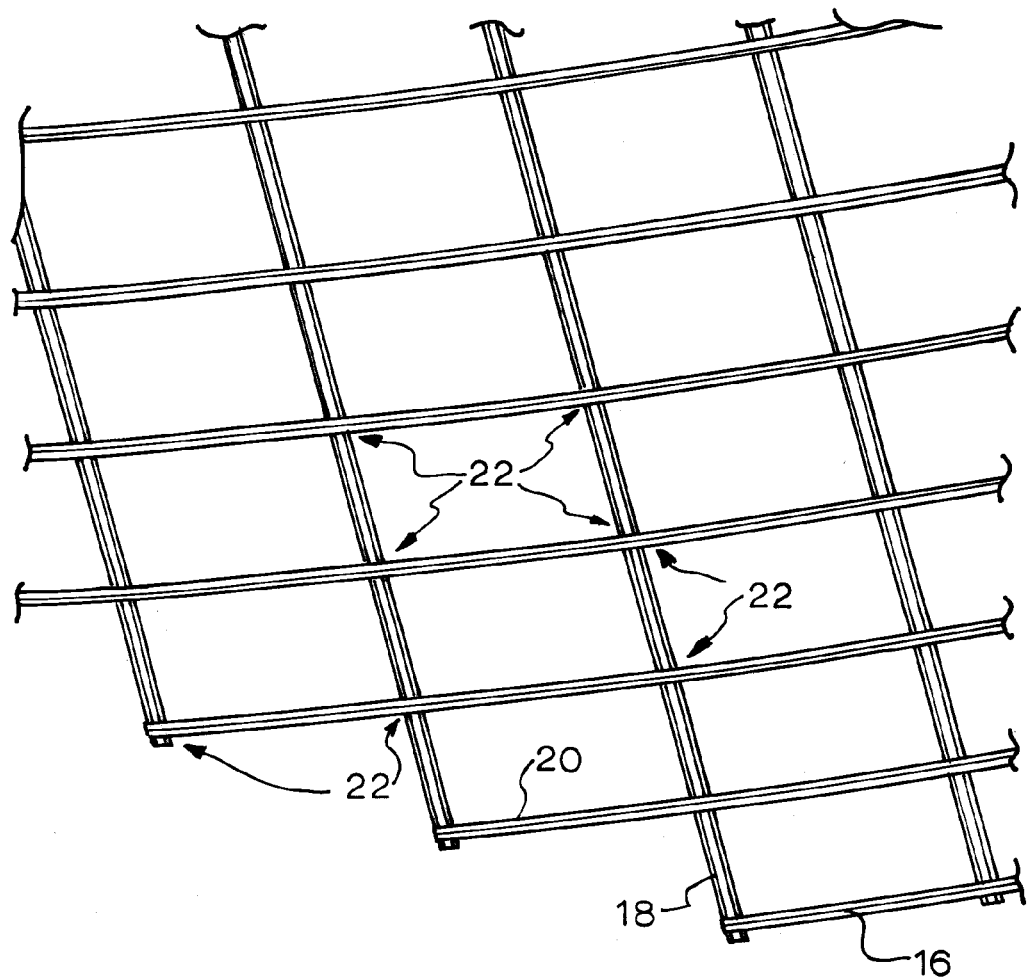
FIG. 2 is a perspective view from the front of a portion of the dish front structure of FIG. 1.
Figure 3:
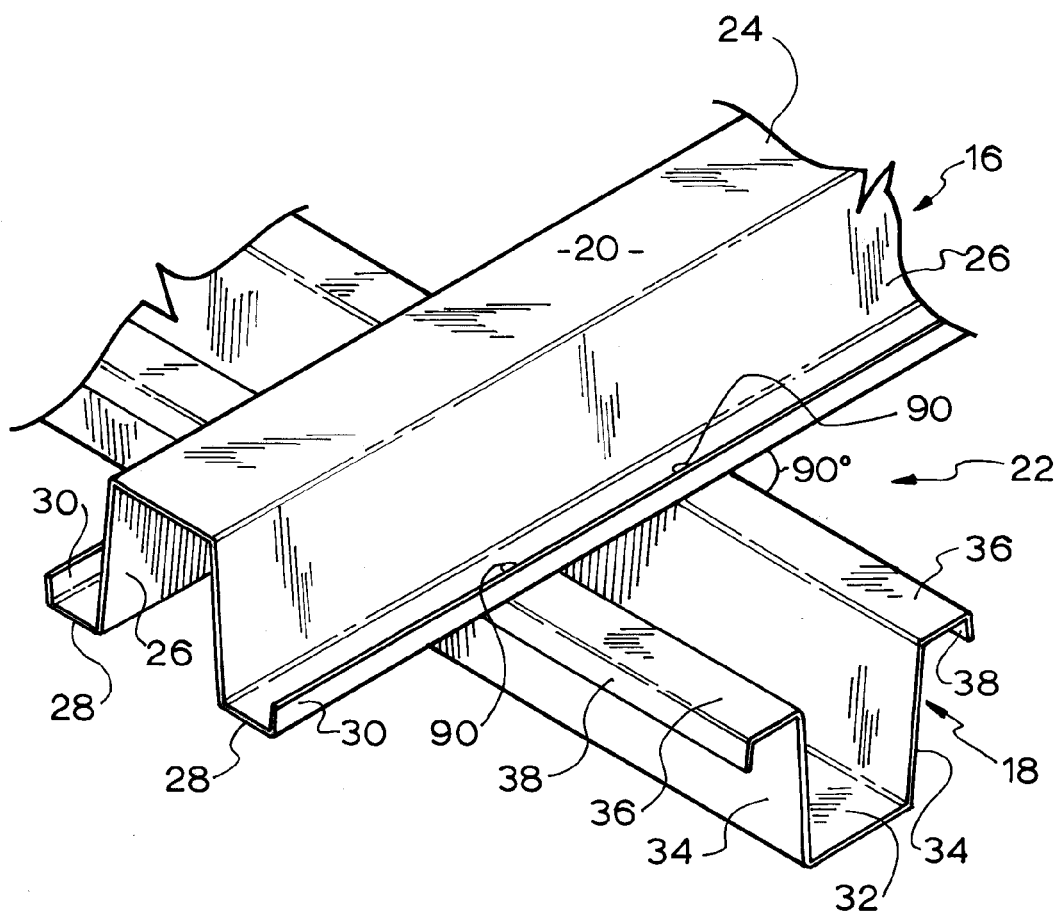
FIG. 3 is a perspective view from the front showing the junction of overlapping front structure members of the dish of FIG. 1.

Referring to FIG. 3, it is seen that each front beam 16 has a generally U-shaped cross section with a planar base 24. The base 24 forms the front surface 20 of the dish structure. Side walls 26 extend upwards from the base 24, in a divergent manner. Top walls 28 extend sideways from the top of the side walls 26 and extend generally parallel to the base 24. Side flanges 30 extend from the outer edge of the top walls 28 toward the base.

This profile provides for stiffness against bending in both the plane of the base 24 and at 90 degrees thereto. The profile chosen is not critical to the invention and other suitable profiles may be used. As an example, the side walls 26 need not be divergent.

The rear beams 18 are substantially the same design, having base 32, side walls 34, rear walls 36 and side flanges 38. In the preferred embodiment the front and rear beams 16, 18 have similar profiles but this is not essential.

The front and rear beams 16, 18 are formed of steel strip and may be easily formed by use of steel strip rolling machines, which form profiles from rolls of flat steel strip. The length of each front or rear beam 16, 18 so formed is in theory unlimited but in practice is limited by the thickness of the steel strip and the effects of gravity. By using a suitable thickness a single front beam 16 may span across the intended dish and may be manipulated during construction without damage or permanent distortion prior to assembly.

The front beams 16 are curved during their creation in the rolling machine and so the front face 20 follows a concave curved surface. In addition, the side walls are not necessarily straight and may also follow a curve.

When assembled the mirrors on the front surface of the dish ideally follow an ideal surface. This ideal surface has a constantly changing radius and approximates a rotated parabolic curve. In use the dish is subject to gravity which will distort the dish. As such the front face of the dish may be designed to follow a predetermined surface that is different from the ideal surface so that, in use, gravity bends the surface back toward the ideal surface.

The curve of the front face 20 of beam 16 preferably has the shape of the predetermined surface for where it will be located in the dish, so that during assembly each front beam 16 is merely placed in position without the need to significantly deflect the front beams 16 to be correctly aligned.

Typical strip rolling machines are usually used for producing lightweight profiles, such as continuous guttering or roof purlins. These typical uses do not require high accuracy and so the accuracy of any curves applied to the individual beams may not be within the tolerance of the finished virtual front surface. However, this is not critical and the method of assembly accommodates this inaccuracy in forming the beams to arrive at a dish with a virtual front surface within the desired tolerances.

By using the assembly techniques explained further, it is possible to utilise relatively cheap, weak and inaccurate rolled profiles in combination with a relatively simple and cheap assembly system to produce a relatively highly accurate and stiff dish front surface. Of course this does not exclude the use of thicker and stiffer beams manufactured to higher accuracy. Nor does it exclude the use of beams that are not formed from rolled strip steel. Beams formed using other techniques or materials may be used. However, at present the use of rolled steel strip provides the best overall cost for the desired accuracy.

In practice it is acceptable to form each front beam 16 with a front surface 20 that has a constant radius rather than a variable radius along its length. This may result in the ends or each beam laying to one side of the desired predetermined surface with the centre portion laying on the other side. The same applies to the rear beams. However, as explained later, this is not critical since the front and rear beams 18 are formed of relatively thin steel sheet and may be elastically deformed to the correct position during assembly.

In the preferred embodiment every third rear beam and every third front beam (hereinafter referred to as primary front and rear beams) is made from thicker strip than the two intermediate beams (hereinafter referred to as secondary front and rear beams).

In the preferred embodiment, which results in a dish structure about 24 meters in diameter, steel strip ranging from about 1.2 mm to about 1.5 mm thick is used for the primary front and rear beams and steel strip about 0.75 mm thick is used for the secondary front and rear beams. These thicknesses are merely indicative and are dependent on the type of steel used. In the preferred embodiment all primary front and rear beams 16, 18 are formed of the same thickness steel. Similarly all secondary front and rear beams are preferably formed of the same thickness steel. This is not to exclude the use of different profiles and/or thicknesses for front and rear beams. If desired, shorter primary and/or secondary beams may be formed of thinner steel than longer beams. Other materials and/or thicknesses may be used.

Whilst the completed front structure may have high dimensional accuracy, the aim is to provide a lightweight structure and as such the individual front and rear beams 18 may deflect under their own weight until joined to other components.

To overcome the flexibility and accuracy issues the invention utilises a "template" method of construction in which a single template or jig is provided or constructed to a very high accuracy and then used to sequentially produce multiple parabolic dish structures.

The aim is to have a dish structure that has a front surface that provides a desired surface to which mirrors may be mounted and that is assembled to that desired surface relatively highly accurately. Because the front surface corresponds accurately to the desired reflecting surface, curved mirror panels may be mounted directly to the front surface of the dish and these will be correctly aligned. Thus the mirror panels do not require any adjustable mounting between themselves and the dish and may be mounted without the need for any alignment or adjustment during or after the mounting phase. This also allows the mirrors to be mounted, bonded glued or otherwise adhered relatively rigidly to the structure and so provide some structural contribution, thereby allowing the dish structure to be made weaker than otherwise.

Figure 4:
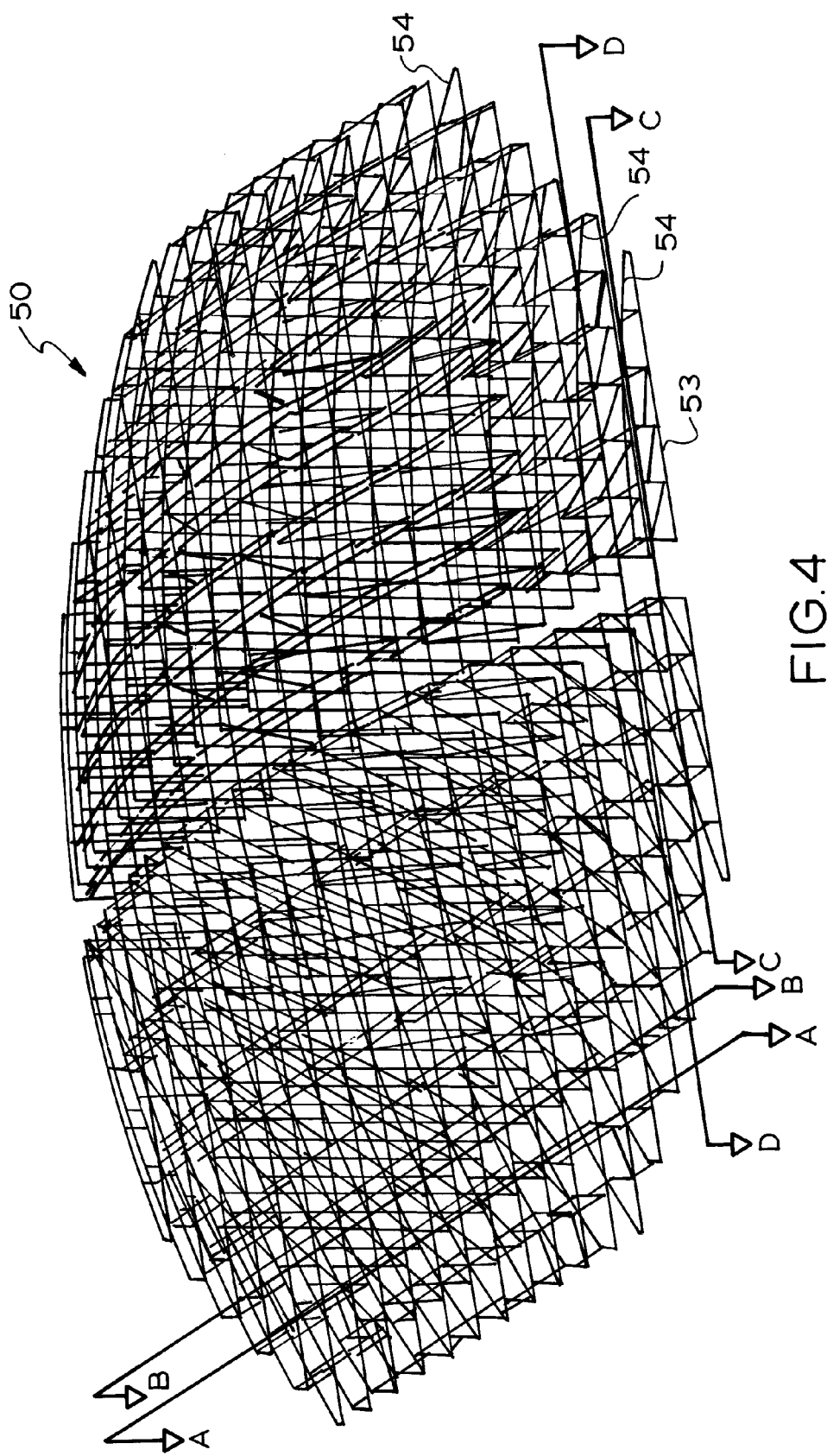
FIG. 4 is a perspective view from above of a jig for use in construction of the dish structure of FIG. 1.

FIG. 4 shows a jig 50 according to one embodiment for constructing the dish structure. The purpose of the jig 50 is to enable the front faces of the front beams to be accurately positioned. Whilst one suitable jig and locating device is described the method of dish construction is not limited to use of the described jig or locating device.

The jig 50 is formed of a support structure 52 that supports a series of generally parallel but curved rails 54. Each rail 54 is curved and, preferably, follows a parabolic curve similar to that of the desired predetermined dish front face. During assembly the front face of the front beams is spaced from the rails so the curve is not identical.

Referring to FIGS. 5 through 9, mounted on each rail 54 are a series of locating devices 56 having a support plate 82 upon which the front beams 16 rest during assembly. These locating devices 56 are height adjustable so that their contact surface may be placed at the correct location.

Figure 5:
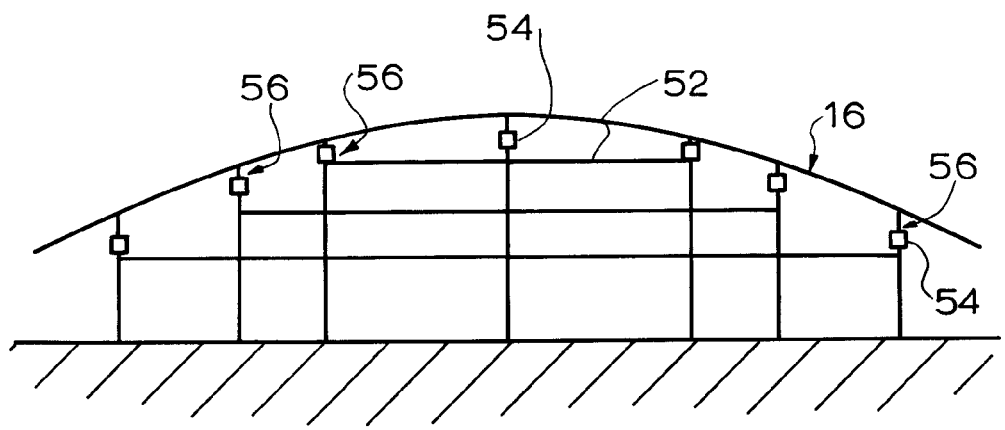
FIG. 5 is a side view of section of the jig taken along line AA of FIG. 4. For clarity only the part of the jig between lines AA and BB are shown.
Figure 6:
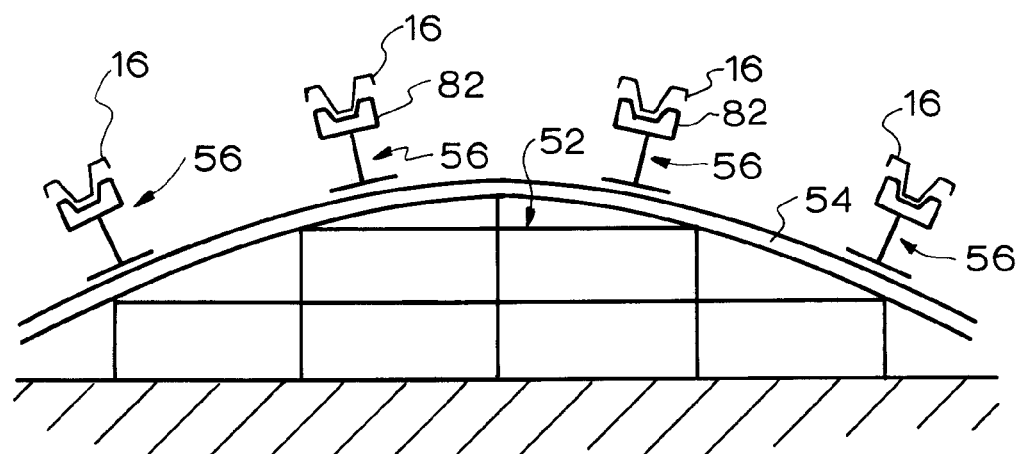
FIG. 6 is a side view of section of the jig taken along line CC of FIG. 4. For clarity only the part of the jig between lines CC and DD are shown.

Each front beam 16 extends transversely across multiple rails, as shown in FIG. 5 and each rail 54 supports a series of spaced apart front beams 16, as shown in FIG. 6.

Figure 7:
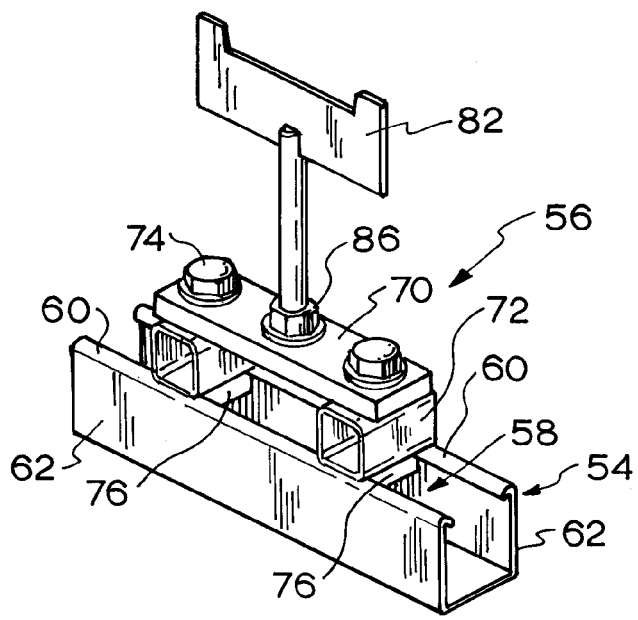
FIG. 7 is a perspective view from above of part of the jig showing a locating device mounted on a rail 54 of the jig.
Figure 8:
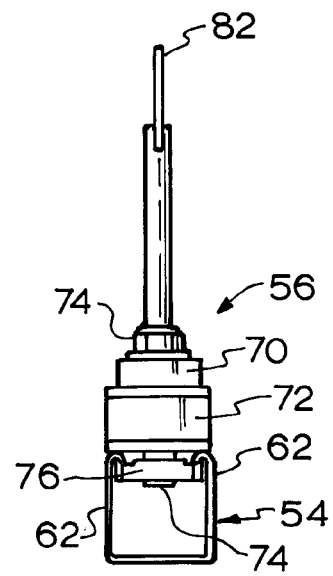
FIG. 8 is an end view of the part of the jig and locating device shown in FIG. 7.
Figure 9:
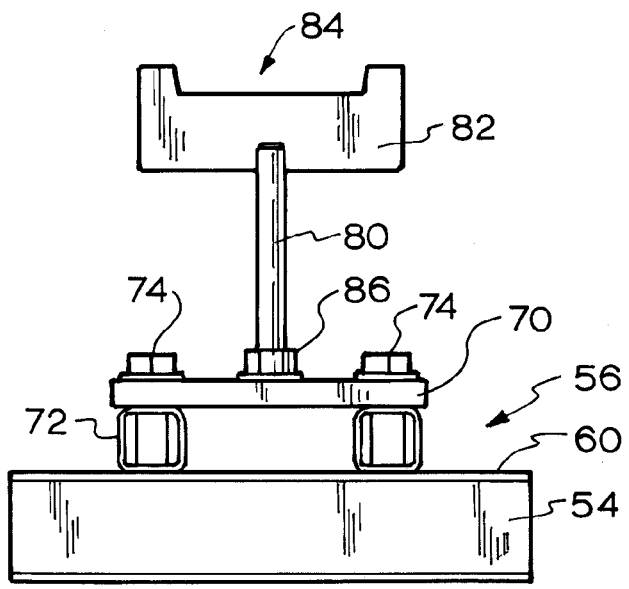
FIG. 9 is a side view of the part of the jig and locating device shown in FIG. 7.

Referring to FIGS. 7 to 9 there is shown a section of rail 54 with a locating device 56 mounted thereon. The rail 54 is U shaped, with its open end 58 upwards. The upper edges 60 of the side walls 62 are curved over and inwards so as to provide two support surfaces 64 upon which the locating device 56 rests. The curved sections also reduce the width of the opening 58.

The locating device 56 includes a base plate 70. The base plate 70 is mounted on two spacers 72 that in turn rest on the top surfaces 64 of the rail 54. The spacers 72 are short sections of square section tubing but this is not critical. Two bolts 74 pass though respective bores in the base plate 70 and the spacers 72 and into a threaded bore in respective keepers 76 located within the rail. The keepers 76 have an upper profile that engages the lower edge of the downwardly curved side walls 62. By tightening the bolts 74 the keepers 72 and spacers 74 tightly grip the rail 54 (with the base plate firmly sandwiched between the bolt heads and the spacers) and so longitudinal movement along the rail is prevented. When the bolts are loose the locating device 56 may be slid along the rail 54 to a desired position.

The profile of the rails 54 used is not critical and neither is the method of mounting the locating device 56 to the rail 54. What is important in this embodiment of the invention is the ability to slide the locating device 56 along the rail 54 and secure it at a desired location.

The base plate 72 has a threaded bore into which a threaded rod 80 is screwed. The top of the rod 80 has the support plate 82 attached thereto. In the preferred form the support plate 82 is formed of flat metal plate and is mounted in a slot provided in the top end of the rod 80. The support plate 82 is affixed to the rod by welding, gluing or other appropriate fixing methods.

By rotating the rod 80 relative to the base plate 72, the support plate 82 is raised or lowered relative to the rail 54. A lock nut 86 is provided so that once the support plate 82 is at the desired height the lock nut 86 may be tightened against the base plate, preventing unintended rotation of the rod 80 and change in height of the support plate 82.

The support plate 82 has a U-shaped recess 84 in its upper edge. This recess has the same profile as the front face 20 and lower portions of the side walls 26 of the front beams 16. In the preferred form the support plate 82 is fixed to the rod 80 and so rotates with the rod. The recess 84 is symmetrical about the axis of the rod 80 so each half rotation will align the support plate with the intended direction of the front beam that it will support. Thus the rod must be rotated to the nearest half turn to place the support plate 82 in the correct orientation. In the preferred embodiment the rod may be positioned within about ±0.5 mm (¼ turn) of the desired height. This is sufficiently accurate for the present invention. If higher accuracy is necessary or desired, other mountings may be used.

As examples, the rod may be threaded sections at both ends with the upper end received in a threaded extension of the support plate with the threads having different directions. Rotation in one direction would cause rasing whilst rotation in the opposite direction would cause lowering. In a similar manner, the use of a turnbuckle would achieve the same result. The support plate may be mounted on the rod so that it is free to rotate relative to the rod about the rod's axis. Alternatively the support plate may be provided with a flat surface upon which the front beam 16 rests, so that its rotational orientation does not matter. Of course having a flat surface requires some other means to locate the front beams 16 sideways.

The jig 50 is preferably assembled on a concrete slab. Whilst this is preferable in aiding the positioning of the supports and more particularly the rails as accurately as possible, it is not critical to the invention. Each locating device 56 can be moved along its rail 54 to be correctly located under the intended path of the front beam that it will support. If the rail 54 is offset transversely relative to its intended position this is not critical as the locating device can still be located under the front beam. If the locating device 56 is offset transversely, the location of the front surface 20 of the front beam 16 where it is supported by the support plate will be at a different height above a datum plane compared to if the rail were not offset. This can be easily accommodated by determining where along the front beam the support plate will be positioned, calculating a corresponding height above the datum plane and adjusting the height of the rod relative to a new desired height. Thus, if heights are calculated on actual position rather than intended position, the original intended location of the locating devices is somewhat immaterial.

Accordingly, the locating devices 56 may first be positioned along the rails at a location where a front beam will be located. The location of the base plates and/or support plates may be surveyed to determine their position in three dimensional space. The calculated desired height of the support plate is calculated or adjusted to allow for the actual position of the base plate. The support plate is then adjusted to the height corresponding to the actual location of the base plate in space.

Using these techniques, the support plates can be positioned within about ±0.5 mm of the predetermined surface. This enables the front faces of the finished dish to be located to a similar accuracy.

Other locating devices may be used. Similarly it is not essential to use rails along which the locating devices slide.

What is important is the ability to position the contact surfaces upon which the front beams rest (the recess 84 in this embodiment) at a required or desired location in three dimensional space within the desired tolerances.

Once all the support plates have been adjusted to the necessary heights, the front beams 16 are placed upside down on the locating devices 56 with the front surfaces 20 resting in the recesses 84 on the support plates 82. Ideally the curve of each front beam 16 is as desired and the front surface 20 of each beam will rest on all support plates 82. Depending on the thickness and type of the material, gravity alone may be sufficient to bend the beams to rest on all support plates. In practice the curvature of the beams may be such that there is no contact at some locations. Accordingly, clamp mechanisms (not shown) may be provided that firmly clamp each front beam 16 to the respective support plate. The front beams 16 are formed of relatively thin metal and so are relatively flexible at this stage whilst unattached to other components. If the curve of the front surface 20 does not correspond to that desired, the act of clamping the front beam 16 to the locating point will draw the front face 20 to the correct curve.

Thus it is possible to deliberately roll the front beams 16 with, for example, the front face having a fixed radius curve and to "correct" the curvature when mounting the front beams 16 on the support plates. In the preferred form the beams are rolled with a constant radius of curvature that is approximately the same as the local radius of curvature at the edge of the dish. When each beam is placed on the jig, its ends will be in the air above the locating devices (ignoring gravity). If gravity does not pull them down, they may be strapped down at various points near the edge to bring them into contact with the locating devices.

Once all the front beams 16 have mounted on the support plates the rear beams 18 are laid transversely across the front beams 16.

As seen in FIG. 3 the rear beams 18 are laid in the opposite orientation with their top walls 36 resting on the top walls 28 of the front beams 16.

The location of each node 22 (where each of the rear beams 18 crosses a front beam 16) is not critical to the shape of the front surface 20 but the preferred positioning of these locations does have advantages for the manufacturing process, as discussed later.

Attachment and location of the rear beams relative to the front beams at each node depends on the nature of the node. The rear structure is preferably attached at some but not at all nodes. Nodes that have the rear structure attached are referred to as primary nodes. Other nodes are referred to as secondary nodes.

Primary nodes are located where primary front and rear beams overlap.

Nodes where primary front and rear beams overlap are not necessarily primary nodes.

For the primary nodes the front and rear beams 16, 18 have holes 90 in their top walls 28, 36 at each primary node, pre-formed before assembly. These holes 90 are preferably formed by the rolling machine and can be positioned along the length of the beams 16, 18 with relatively high accuracy. Accordingly, it is a relatively simple procedure to align the holes 90 in the top walls 28, 36 of the front and rear beams 18 to accurately align the rear beams 18 relative to the front beams 16. These holes 90 preferably have the same spatial relationship to each other for all primary nodes.

Figure 10:
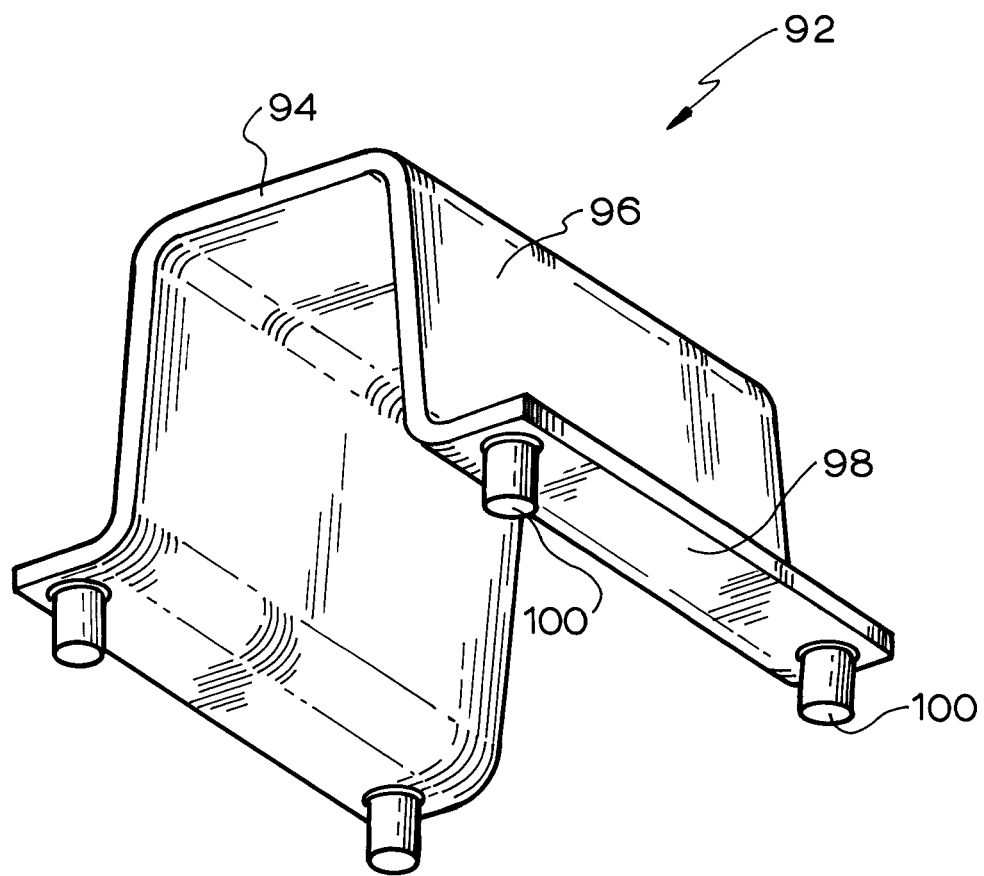
FIG. 10 is a perspective view from the below of a saddle used to join overlapping members of the front structure.
Figure 11:
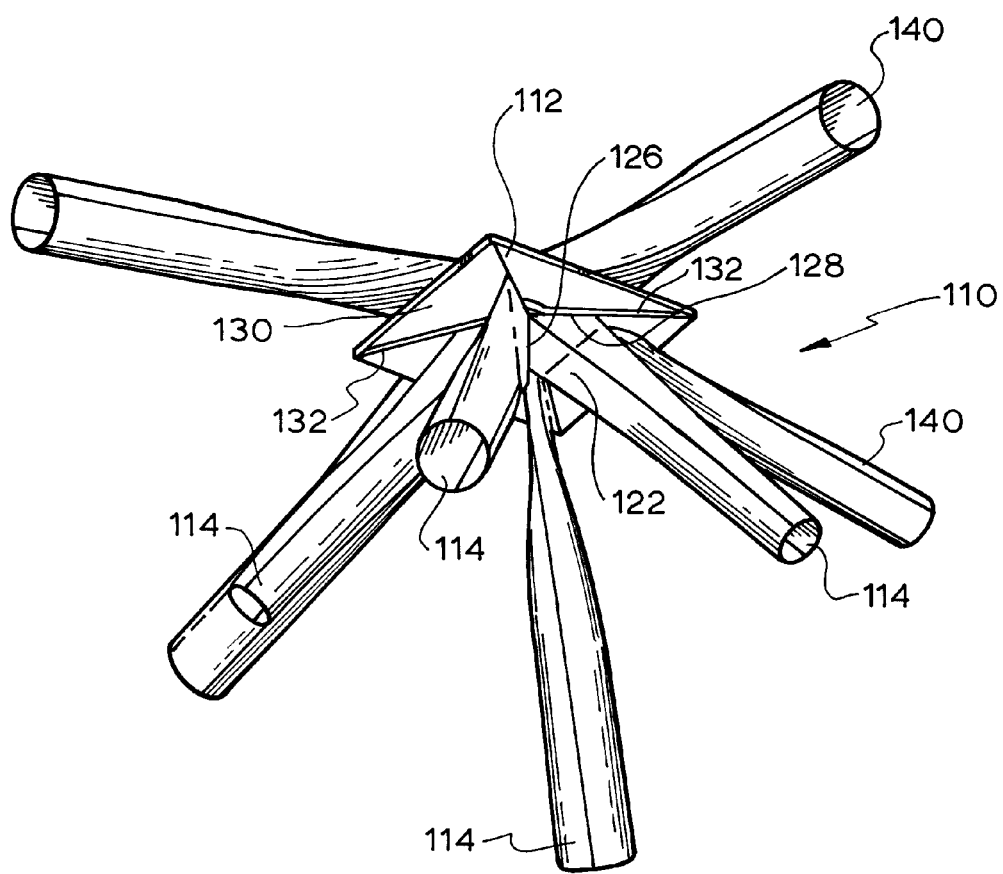
FIG. 11 is a perspective view from the front of part of a pyramidal rear structure of the dish.
Figure 16:
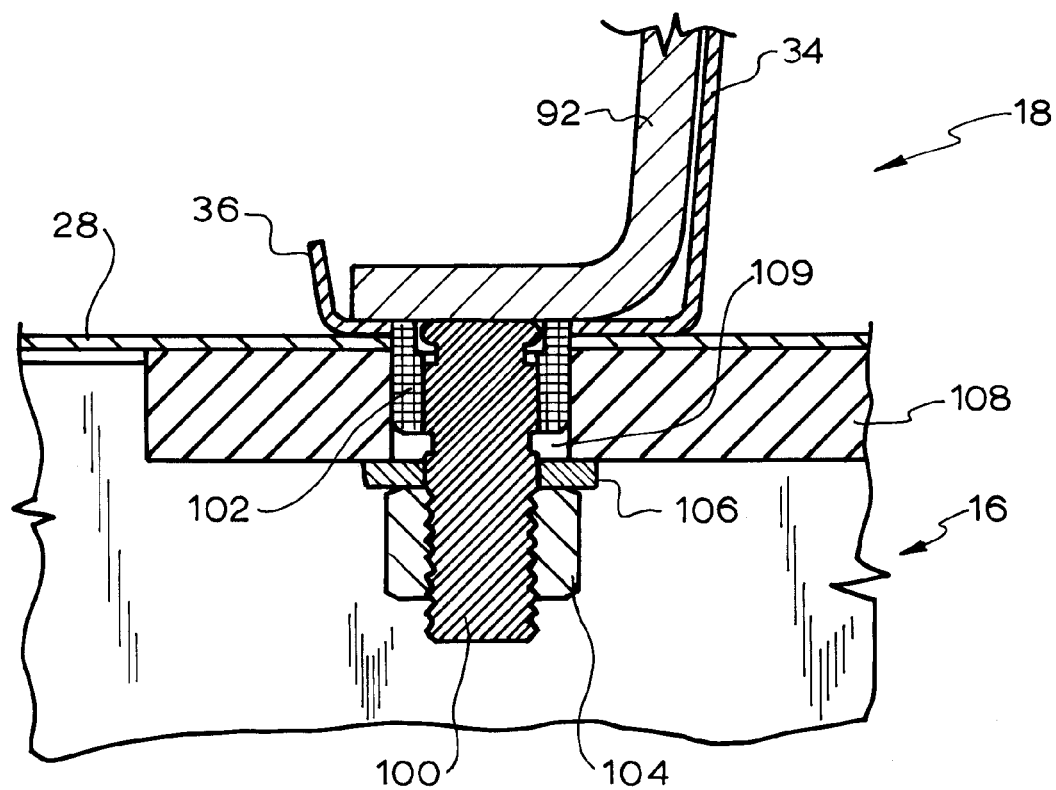
FIG. 16 is a cross sectional view showing connection of the saddle of FIG. 10 with the overlapping members of the front structure.

Referring to FIGS. 10 and 16 a saddle 92 is provided that is placed over the rear of the rear beams at the primary nodes. The saddle 92 has a U shaped profile corresponding to the outer shape of the rear beams 18 and has a base 94, side walls 96 and top walls 98. The top walls 98 are narrow enough to sit in the groove between the side walls 34 and flanges 36 of the rear beams 18. Studs 100 extend from the top walls. A collar 102 is provided around each of these studs. The collars 102 aid in transfer of loads. The studs 100 and collars 102 are positioned and sized to pass through the holes 90 in the front and rear beams 16, 18. Thus, once the saddle 92 has been mounted on the rear beam 18 with the studs 100 and collars 102 passing through the holes, the front and rear beams 16, 18 are unable to move relative to each other at that node.

In the preferred embodiment the saddle 92 is a permanent part of the dish structure and remains at the node. The studs 100 are preferably threaded and the saddle 92 is secured by nuts 104 and washers 106 mounted on the studs 100. Preferably a bar 108 is mounted on the studs 100 running along each side of the front beam (and across the rear beam) between the nuts and the wall 28 to spread loads. As seen in FIG. 10b, the bar 108 has an oversized bore 109 into which the collar 102 extends. If desired the front and rear beams 16, 18 may also be secured by spot welding or the like. The saddle 92 is preferred as a permanent component since it may be made of relatively thick walled material that may be easily welded to, as discussed later.

If desired, the saddle 92 may be used merely as a locating tool, with the front and rear beams 18 welded or otherwise secured to each other and the saddle 92 removed afterwards.

In the preferred embodiment secondary nodes are not provided with holes in the front or rear beams. Instead the location of each secondary node is preferably marked on the front and/or rear beams. These markings may be placed on the beams by the rolling machines. These markings may be small surface indents pressed into the beams or surface markings, such as paint or ink. The beams are positioned using the markings and then secured together in the correct position using suitable fasteners or fastening means, such as self piercing rivets.

As mentioned above, the inventive location of each node 22 is chosen partly to simplify manufacturing but also for structural reasons. In the preferred form the rear beams 18 cross the front beans at 90 degrees, in a plane tangent to the intended paraboloid surface.

Attached to the rear of the front structure 12 is the rear structure 14, comprised of a plurality of pyramidal structures 110. Each pyramid 110 comprises a "node cap" 112 and front struts 114, each extending outwards and downwards from the node cap 112 toward the rear of the front structure 12. In the preferred embodiment there are four front struts 114 for most of the pyramids 110 that extend and are attached at four separate nodes 22. Pyramids at the periphery of the dish generally only have three struts. The struts 114 are preferably welded to the saddles 92 at the nodes but may be attached to the rear beams if saddles are not used. If desired, the struts 114 may extend to and be attached to the rear beams at locations between nodes 22.

In the preferred embodiment the node caps 112 are positioned to lie on the virtual surface of a sphere. Since the front surface 20 of the dish and the front and rear beams 16, 18 follow a generally parabolic surface the distance from each node cap 112 to each node 22 varies. Accordingly, the length of each front strut 114 varies, as does the angle at which it extends relative to its node cap 112, its node 22 and rear beam 18.

Figure 12:
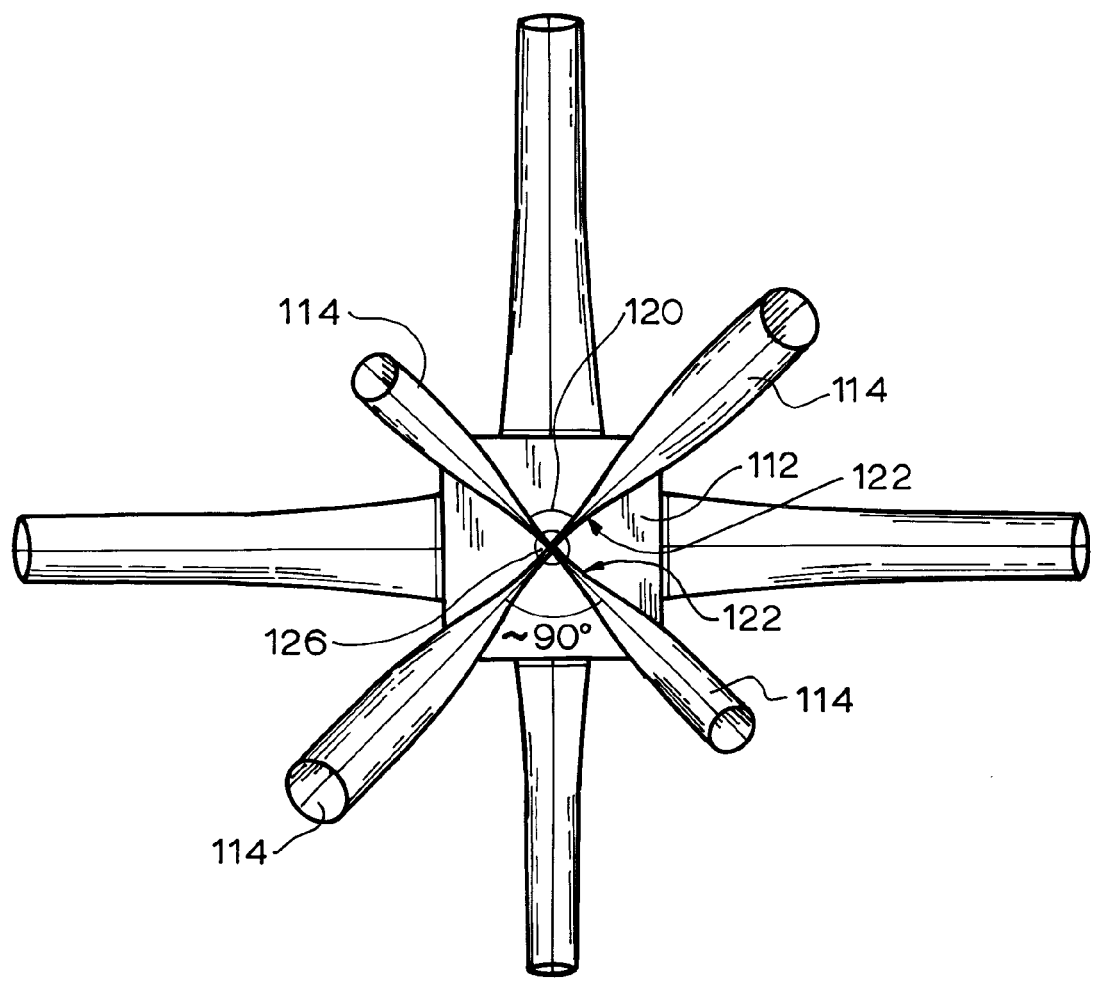
FIG. 12 is a plan view from the front of the structure shown in FIG. 11.

In the preferred embodiment, when viewed along a line perpendicular to the node cap, (i.e. a line radial to the virtual sphere) as shown in FIG. 12, the adjacent struts are perpendicular or substantially perpendicular to each other, i.e. the angle 120 between the adjacent struts of all of the pyramids is substantially 90 degrees. Ideally all angles are 90 degrees but in practice this is not possible. In the preferred embodiment the struts may be at 90 degrees±1.5 degrees. A greater tolerance may be used. The angle of inclination of the struts of a single pyramid 110 relative to the radial line of the node cap 112 will vary because the distances from the node caps to the four respective nodes is not the same. Similarly the angle of inclination of struts 114 will change between pyramids 110 as the node cap to node distances are not necessarily the same between pyramids.

In the preferred embodiment each strut 114 is formed of a length of round section tubing. The end portions 122, 124 of each strut are flattened. The rear end portion 122 is also cut to a point having two converging edges, 126, 128. The angles of each edge relative to the longitudinal axis of the strut are varied to accommodate the angle of the strut to the node cap 112 so that the inner edges 126 of the four struts are adjacent to each other at the centre of the node cap 112 and extend away from the node cap 112 along a common line radial to the centre of the virtual sphere whilst the outer edges 128 extend along the lower surface 130 of the node cap 112. In the preferred embodiment the node cap 112 is not a flat plate but a four sided cone, with the outer edges 128 extending along the ridge line 132 of adjacent cone faces. The inner edges 126 preferably extend along the centreline of the cone.

By arranging the struts 114 so that they extend at or near 90 degrees to each other and with the inner edges 126 extending along a common line, it is relatively simple for a jig to be made that aligns the struts at or near 90 degrees to each other for all pyramids. It will be appreciated that the angle of the struts relative to the node cap 112 will change but this is easily accommodated by an adjustable jig. Once positioned correctly the struts 114 can be welded to each other and the underside 130 of the node cap 112.

Figure 14:
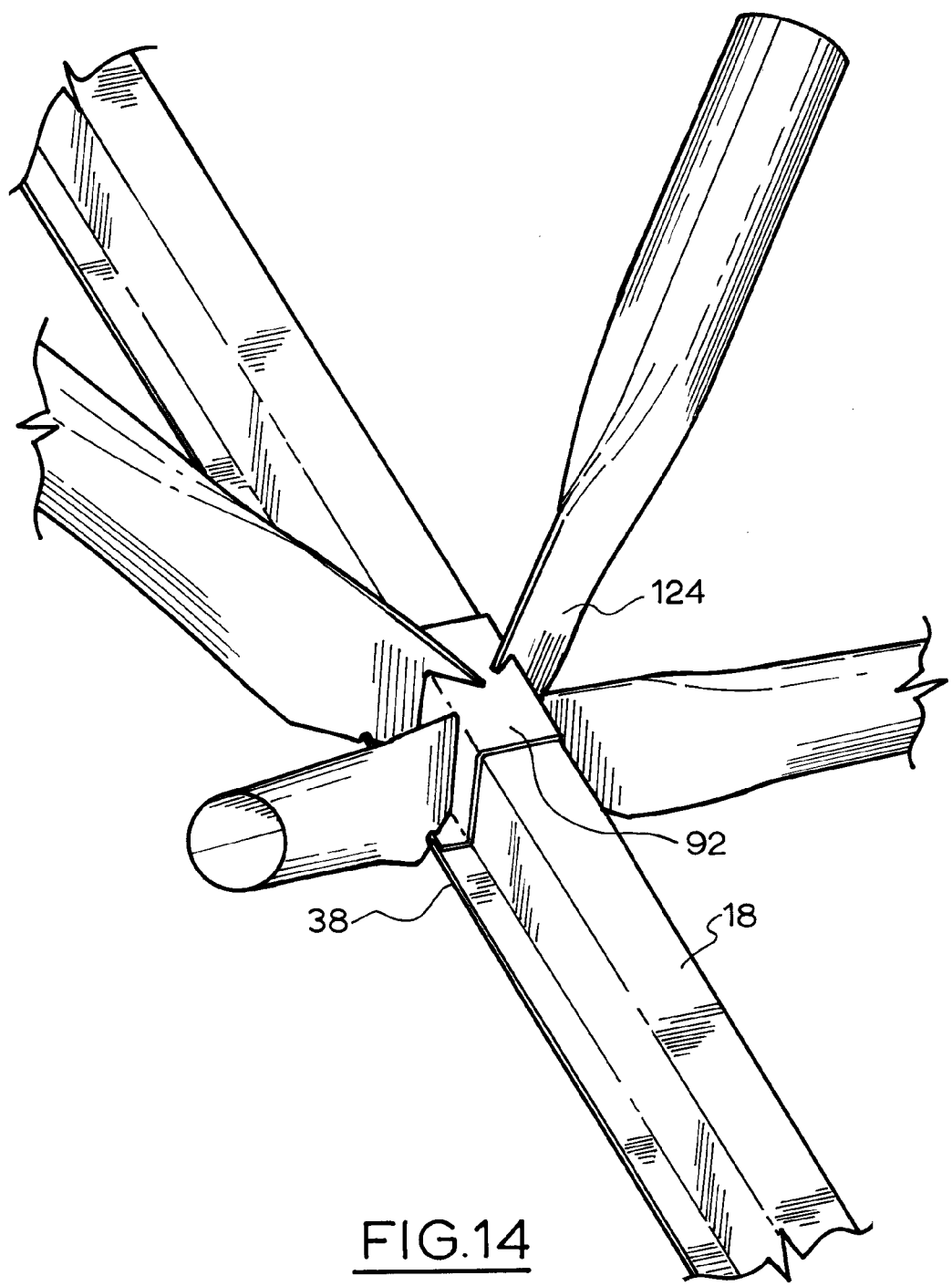
FIG. 14 is a perspective view from the rear showing the junction of pyramid struts with the front structure of the dish.
Figure 15:
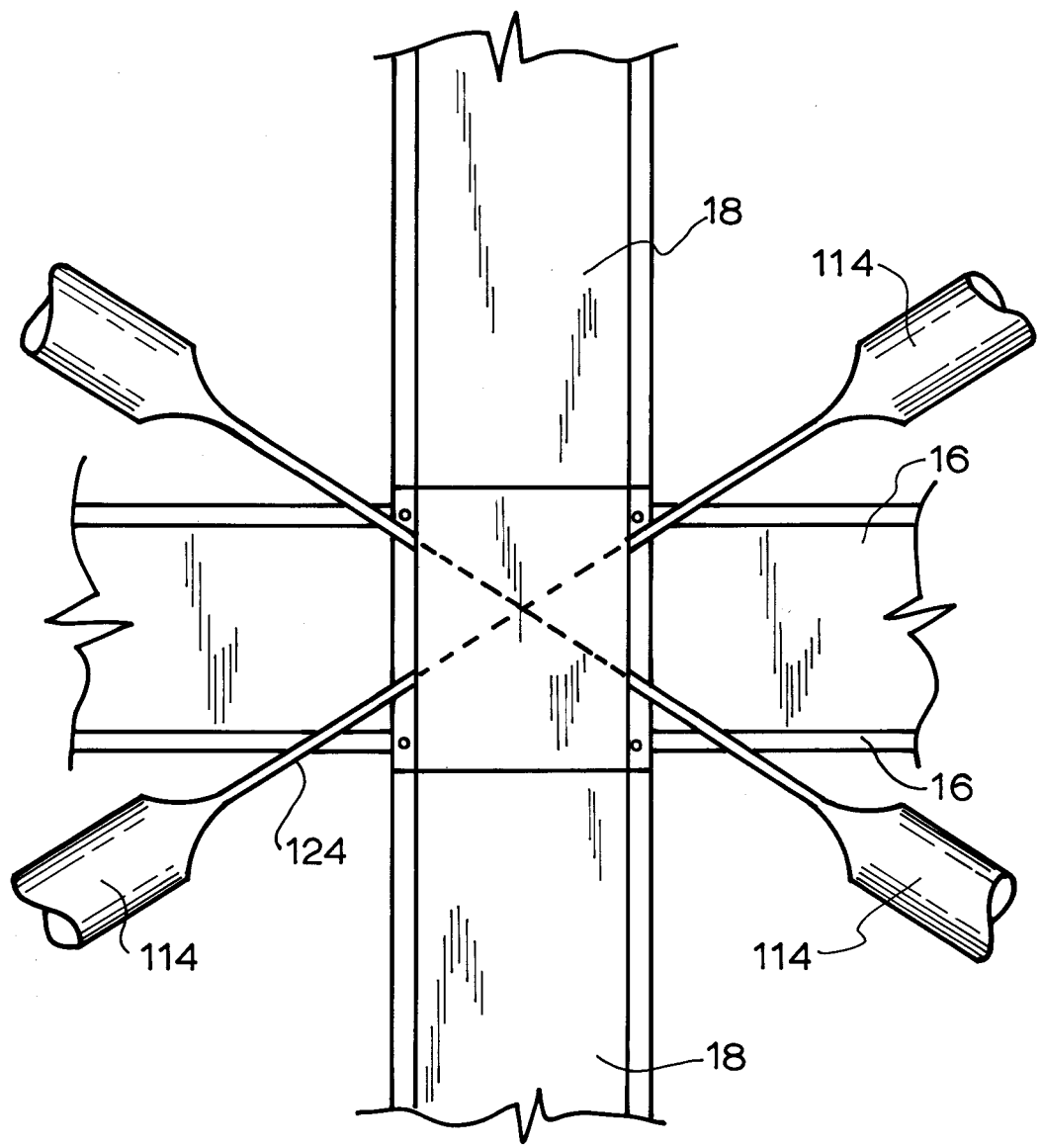
FIG. 15 is a plan view from the rear showing the junction of pyramid struts with the front structure of the dish.

The struts 114 of each pyramid 110 extend to four separate nodes and, in the preferred embodiment, are welded to the saddles 92 at each node, as shown in FIG. 14. Thus each node 22 has four struts, each attached to a different node cap. By using a saddle 92 the thickness of the rear beams 18 is not a factor in relation to securing the struts 114.

The front end portions 124 of each strut are also flattened and cut to align with the saddle 92. The flattened end portions 124 are cut to align with the surfaces of the saddle 92 and to clear flanges 38 of the rear beams 18.

Since the struts 114 are already attached to the node caps, they are fixed relative to each other and it is merely a matter of placing each pyramid in position and holding the struts 114 against the saddle 92. The flattened portions do not need to all extend at 90 degrees to each other and generally extend toward the rear beams at about 45 degrees±about 10 degrees. There is no need to adjust angles to hold the struts at the desired angle. When positioned correctly, the struts 114 are then welded to the saddles 92. If saddles are not used the struts 114 may be welded directly to the rear beams 18.

The two flattened end portions 122, 124 of each strut will not be aligned and will be rotated about the longitudinal axis relative to each other. Whilst round section tubing is preferred because the starting rotation of the struts before flattening is irrelevant, non circular profile tubing, such as oval or square section, may be used. In these cases the rotation of the tube about its axis will need to be determined prior to the flattening and cutting steps.

Figure 13:
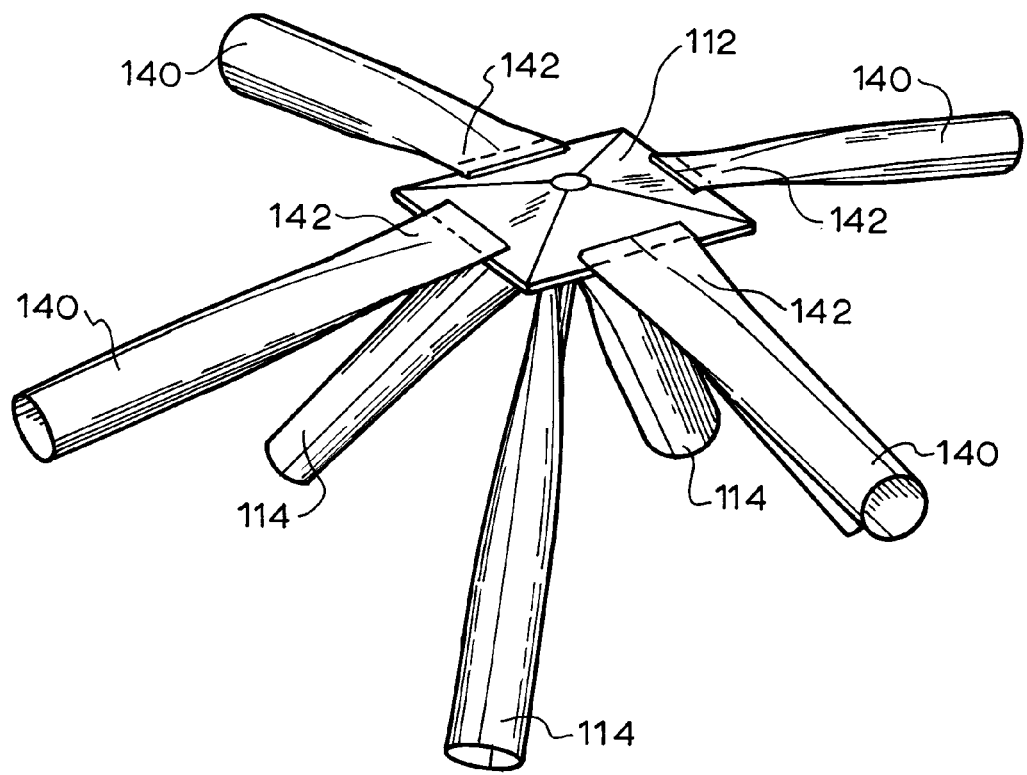
FIG. 13 is a perspective view from the rear of the structure shown in FIG. 11.

Once pyramids 110 have been attached to the saddles 92, chord members 140 are welded to the rear faces of the node caps, as seen in FIG. 13, between adjacent node caps 112. In the preferred embodiment these chord members are also formed from round section tubing with flattened ends. Accordingly, the front struts and chord members 114, 140 may be manufactured using the same technique, if not the same machine. Preferably these chord members 140 use the same tube as the front struts 114.

In the preferred embodiment the node caps 112 all lie substantially on the surface of a virtual sphere. The chord members 140 all extend at generally the same angle to the tangent to the sphere and both end portions of a chord member will be aligned. The lengths of the chord members vary and so the angle to the tangent to the sphere will vary. In the preferred embodiment they are within about ±0.5 degrees of a set angle. Because the node caps are pyramidal it will be appreciated that the flattened end portions 142 will be angled to align with the top surface of the node caps.

Once the chord members have been secured to the node caps 112 the dish structure 10 is compete and may be removed from the jig for subsequent attachment of mirrors to the front face and mounting of the dish to suitable support/steering structure.

The front surface of the dish 10 thus comprises a series of spaced apart front beams that define a substantially parabolic surface. The front face 20 of each front beam 16 provides a surface to which mirrors may be mounted directly without significant mounting structures or adjustment. The use of the jig in the construction of the dish results in the front faces being positioned relatively highly accurately. Mirror panels may be mounted directly to the front faces and will be correctly aligned.

FIGS. 17 and 18 show a portion of a dish 10 partly covered with mirror panels 150. These mirror panels 150 are shaped to align generally with the front beams and may be placed end on end along adjacent beams. These panels are generally "rectangular", albeit the surface is parabolic so the edges do not follow a straight line. The front beams 16 are positioned and shaped so that the longitudinal edges of adjacent panels extend over the front face and may be attached directly to the front beams. This also enables placement on the front beams 16 with relatively little open space between panels (due to geometry). Accordingly, the percentage of gross dish area that is usable is increased. The use of "rectangular" mirrors also results in efficient use of glass in the manufacture of these mirrors.

In the preferred embodiment the mirrors are bonded or otherwise attached directly to the front beams using suitable adhesive, glue, mastic or the like. Preferably the compound(s) used provide a load bearing connection such that the mirrors provide some cross bracing to the structure, thus enabling the rest of the structure to be of lower strength and lower mass that otherwise.

The preferred embodiment utilises curved front beams that each have a singe mounting area defined by a front face that is substantially continuous and in which substantially all of that front face lies on the virtual front surface. However, it is within the scope of the invention to have a discontinuous front face, or separate mounting areas to which the mirrors may be mounted.

Figure 19A:
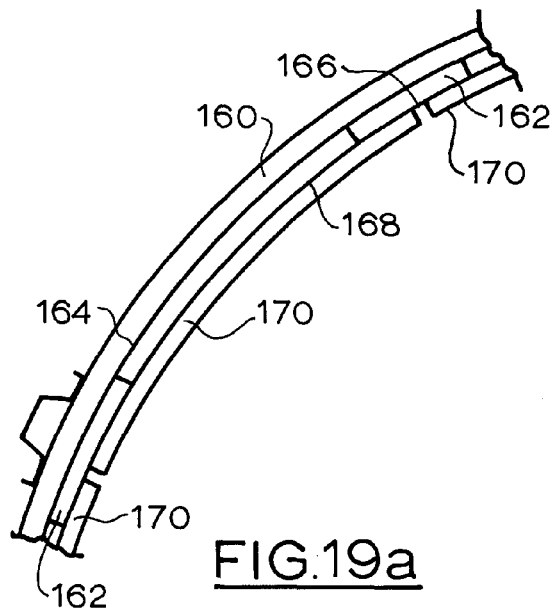
FIG. 19a is a side view of a front beam with an alternate mounting arrangement for the mirrors.
Figure 19B:
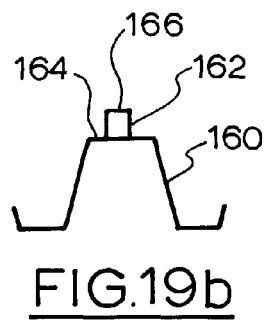

FIG. 19 shows a first variation in which curved front beams 160 are provided with discrete mounting areas 162 on their front face 164. The front face 166 of the mounting areas lie on and substantially follow the virtual front surface 168 in at least along the length of the front beams 160. Mirrors 170 are bonded or otherwise mounted to the mounting areas 164 at the four corners of each mirror. Four mirrors may be bonded at each mounting area 164.

Figure 20:
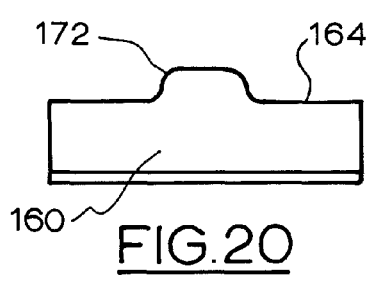
FIG. 20 is an side view of an alternate front beam to that shown in FIGS. 19a and 19b.

The mounting areas 164 may be discrete components that are attached to the front face, as shown in FIG. 19 or may be formed by pressing out a portion 172 of the front face 164, as shown in FIG. 20.

Figure 21:
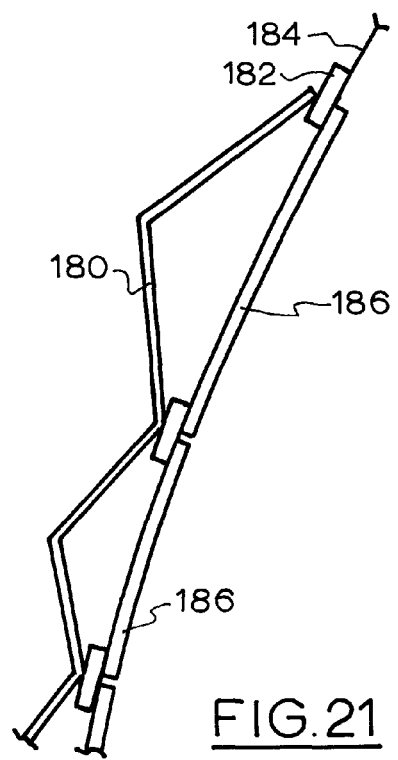
FIG. 21 is a side view of an alternative front beam with an alternate mounting arrangement for the mirrors.

The front beams need not be a continuous curve and may be formed of a series of linear or bents sections, as shown in FIG. 21, in which the front beam is formed of an angulated strut 180 that has mounting areas 182 spaced along its length. Again the mounting areas 182 are located on a virtual front surface 184 and mirrors 186 are bonded or otherwise mounted on the mounting areas.

In all variants the mounting area(s) need not be the central part of the front beams and, for example, mounting area(s) may be provided on the side portions of the front beams rather than the central front face. In addition, the mounting area(s) need not be the forward most part of the beam.

The jig and method of manufacture previously described may be used with these variants. It is merely necessary that the mounting areas are located on or above the support points so that when the beam is loaded and brought into contact with all support points, it is the mounting areas that contact the support points.

It will be apparent to those skilled in the art that many obvious modifications and variations may be made to the embodiments described herein without departing from the spirit or scope of the invention.

The invention claimed is:

1. A dish structure having:
   a first virtual front surface which lies substantially on a paraboloid of revolution, the front surface having a periphery, and
   a plurality of spaced apart non overlapping elongate front beams, each of which extends between two points on the periphery,
   each front beam having at least one mounting area for receiving a reflective panel, the at least one mounting area lies substantially on the paraboloid of revolution of the virtual front surface in the longitudinal direction of the front beam,
   a plurality of sheet like rigid pre-curved reflective panels mounted relatively rigidly on said at least one mounting area of the front beams, the panels having a rear surface, that area of rear surface overlaying a mounting area having a curvature in the longitudinal direction of the front beam substantially to the same as the curvature of the respective mounting area in the longitudinal direction of the front beam,
   wherein at least part of the rear surface of each reflective panel is bonded directly to said at least one mounting area of the front beams;
   said at least one mounting area of each front beam is fixed and non adjustable relative to the remainder of the front beam;
   each reflective panel extends transversely between two adjacent front beams with side edge regions of the rear surface of each panel extending transversely over a part of the transverse width of the respective at least one mounting area of the two adjacent front beams;
   transversely adjacent reflective panels are mounted directly to the same front beam, and
   each reflective panel has a surface that reflects electromagnetic radiation that, prior to and after mounting on the front beams, lies substantially on a paraboloid of revolution.

2. The dish of claim 1 wherein each front beam has a face and said at least one mounting area is part of, flush with, protrudes from or is recessed relative to the face.

3. The dish of claim 2 wherein said at least one mounting area of each front beam comprises a single mounting area.

4. The dish of claim 1 wherein transversely adjacent reflective panels are mounted directly to the same at least one mounting area of a front beam.

5. The dish of claim 1 wherein the reflective panels are load bearing and the reflective panels are mounted to the at least one mounting area of the front beams to provide a load bearing connection between each reflective panel and the at least one mounting area.

6. The dish of claim 5 wherein each reflective panel is bonded to the front surface of the front beams.

7. The dish of claim 5 wherein substantially all of each side edge region is bonded to the front surface of the front beams.

8. The dish of claim 5 wherein the reflective panels are mounted to the at least one mounting area of the front beams using adhesive, glue or mastic.

9. The dish of claim 1 including a series of spaced apart non overlapping elongate rear beams, each of which extends transversely across and is attached to the rear of at least two front beams.

10. The dish of claim 9 wherein the intersection of a rear beam with a front beam is at substantially 90 degrees to the respective front beam.

11. The dish of claim 9 wherein at the intersection of a rear beam with a front beam that part of the rear beam is substantially in a plane parallel to the plane tangent to the first virtual surface at that location.

12. The dish of claim 9 wherein each rear beam extends between two points on or adjacent the periphery.

13. The dish of claim 9 including a plurality of pyramid like structures having struts joined at an apex, the pyramids providing structural support to the front beams and wherein each strut extends to a rear beam.

14. The dish of claim 13 wherein each pyramid has at least three struts that extend from the apex at substantially 90 degrees to at least one adjacent strut.

15. The dish of claim 13 wherein the apexes lie on a virtual spherical surface.

16. The dish of claim 1 wherein each front beam is curved in two directions.

17. A curved reflector of electromagnetic radiation, the reflector including:
   a frame having a plurality of elongate front beams each having at least one curved mounting area that lies substantially on a paraboloid of revolution;
   a plurality of rigid pre-curved mirror panels,
   wherein the mirror panels are mounted relatively rigidly on said at least one mounting area of the front beams, and
   wherein at least a part of the rear surface of each reflective mirror panel is bonded directly to said at least one mounting area of the front beams, and
   wherein the mirror panels are load bearing and the mirror panels are mounted to the at least one mounting area of the front beams to provide a load bearing connection between each mirror panel and the at least one mounting area, and
   wherein
   said at least one mounting area of each front beam is fixed and non adjustable relative to the remainder of the front beam;
   each mirror panel extends transversely between two adjacent front beams with side edge regions of each panel extending transversely over a part of the transverse width of the respective at least one mounting area of the two adjacent front beams, and
   wherein
   transversely adjacent mirror panels are mounted directly to the same front beam, and
   each rigid pre-curved mirror panel has a surface that reflects electromagnetic radiation that, prior to and after mounting on the front beams lies substantially on a paraboloid of revolution.

18. The reflector of claim 17 having a virtual front surface wherein each front beam extends between two points on or adjacent to the periphery of the virtual front surface.

19. The reflector of claim 18 wherein the rear surface of each curved mirror panel lies substantially on a paraboloid of revolution.

20. The reflector of claim 17 wherein transversely adjacent mirror panels are mounted directly to the same at least one mounting area of a front beam.

21. A curved reflector of claim 17 wherein the reflective panels are mounted to the at least one mounting area of the front beams using adhesive, glue or mastic.

* * * * *